United States Patent
Piva et al.

(10) Patent No.: US 10,586,228 B2
(45) Date of Patent: Mar. 10, 2020

(54) METHOD FOR SECURE MOBILE PAYMENT AND RF TAG WITH INTEGRATED ANTI-THEFT DEVICE

(71) Applicant: SAMSUNG ELETRÔNICA DA AMAZÔNIA LTDA., Manaus-Am (BR)

(72) Inventors: Fabio R. Piva, São Paulo (BR); Orlando Volpato Filho, São Paulo (BR); Fernando L. Koch, São Paulo (BR)

(73) Assignee: SAMSUNG ELETRÔNICA DA AMAZÔNIA LTDA., Campinas-São Paulo (BR)

( * ) Notice: Subject to any disclaimer, the term of this patent is extended or adjusted under 35 U.S.C. 154(b) by 0 days.

(21) Appl. No.: 14/253,310

(22) Filed: Apr. 15, 2014

(65) Prior Publication Data
US 2015/0242842 A1    Aug. 27, 2015

(30) Foreign Application Priority Data

Feb. 21, 2014    (BR) .......................... 1020140042067

(51) Int. Cl.
*G06Q 20/38*    (2012.01)
*G08B 13/24*    (2006.01)
*G06Q 20/32*    (2012.01)

(52) U.S. Cl.
CPC ....... *G06Q 20/3278* (2013.01); *G06Q 20/322* (2013.01); *G06Q 20/3276* (2013.01); *G06Q 20/382* (2013.01); *G08B 13/246* (2013.01)

(58) Field of Classification Search
CPC ..... G06K 15/00; G06F 15/16; H04M 1/72538

USPC ............................................ 235/383; 709/218
See application file for complete search history.

(56) References Cited

U.S. PATENT DOCUMENTS

| | | | |
|---|---|---|---|
| 8,072,332 B2 | 12/2011 | Forster | |
| 8,494,908 B2 | 7/2013 | Herwig et al. | |
| 8,505,829 B2 | 8/2013 | Wilkinson | |
| 8,531,295 B2 * | 9/2013 | Manske | G06Q 20/0453 340/568.1 |
| 8,783,438 B2 * | 7/2014 | Phan | A47F 9/04 186/61 |
| 9,338,276 B2 * | 5/2016 | Yew | H04M 1/72527 |
| 9,773,386 B2 * | 9/2017 | Aldahbaj | G07G 1/0054 |

(Continued)

FOREIGN PATENT DOCUMENTS

EP    2642445 A1    9/2013

OTHER PUBLICATIONS

Jantunen, I., et al., "System architechture for high-speed Close-proximity Low-power RF Memory tags and Wireless Internet Access," International Journal on Advances in Telecommunications, vol. 4, No. 3 & 4 year 2011 (http:www.iariajournals.org/telecommunications/).*

*Primary Examiner* — Daniel S Felten

(57) ABSTRACT

An RF tag with integrated anti-theft device allows a user, having a mobile device, to perform a secure purchasing application where the user uses the camera of the mobile device to read a barcode of a product and an RF tag with an integrated anti-theft device. The user can select the product he wishes to buy, check the information concerning that product, purchase the product, and disable the anti-theft device to go through a security portal without triggering the alarm.

7 Claims, 3 Drawing Sheets

(56) References Cited

U.S. PATENT DOCUMENTS

| | | | |
|---|---|---|---|
| 2003/0063524 A1* | 4/2003 | Niemiec | A61B 5/0002 368/10 |
| 2005/0044179 A1* | 2/2005 | Hunter | G06F 17/30879 709/218 |
| 2006/0043175 A1* | 3/2006 | Fu | G06Q 20/32 235/383 |
| 2009/0044012 A1* | 2/2009 | Bishop | G06Q 20/20 713/168 |
| 2010/0328043 A1* | 12/2010 | Jantunen | G06K 7/0008 340/10.3 |
| 2011/0074582 A1 | 3/2011 | Alexis | |
| 2014/0046998 A1* | 2/2014 | Dain | G06F 9/5061 709/201 |
| 2015/0065055 A1* | 3/2015 | Newham | H04W 76/023 455/41.3 |
| 2015/0294126 A1* | 10/2015 | Colby | G06K 19/07345 340/10.51 |

* cited by examiner

METHOD FOR SECURE MOBILE PAYMENT AND RF TAG WITH INTEGRATED ANTI-THEFT DEVICE

CROSS-REFERENCE TO RELATED APPLICATIONS

This application claims the benefit of Brazilian Application No. BR 10 2014 004206 7, filed Feb. 21, 2014, in the Brazilian Intellectual Property Office, the disclosure of which is incorporated herein by reference.

BACKGROUND

1. Field

The following description relates to a method and a Radio Frequency (RF) tag with an integrated anti-theft device related to data security in mobile payment transactions. More particularly, it relates to a way to complete purchases without requiring sales clerks to remove an anti-theft tag device. Mobile payment is made through software installed on the mobile device, which after the product payment has been made, is able to communicate with a RF tag and thereby enable and/or disable the anti-theft tag device, and consequently leave the store with the product without activating the anti-theft alarm.

2. Description of the Related Art

The payment for purchases in retail stores has become an unpleasant experience to users that often need to spend a long time in queues, considering that many retailers have few lanes available for a lot of clients. In this case, some techniques to enhance the payment of items in retail stores, supermarkets, and other commercial establishments have been employed in the art to mitigate this problem. Several implementations of RF tags and methods for faster payment make use of specific self-service terminals for registration, payment, and deactivation of an anti-theft device. Others make use of radio frequency tags in combination with an anti-theft device that can be disabled only by conventional means, i.e. operated by an employee in the property box.

The patent document EP 2642445 A1, entitled: "Network-Based Self-Checkout", posted on Sep. 25, 2013, presents techniques based on a self-payment network, where the consumer uses a mobile application to read barcodes of items to be purchased. The list of items purchased is transferred to the cashier's purchasing network that sends a code to the application manager to validate the purchase. The purchased items then have their anti-theft devices disabled in a box. The present disclosure, through the use of RF label, does not require a box to disable the anti-theft device, thus avoiding queues.

The patent document U.S. 2006/0043175 A1 entitled: "Mobile Banking and Anti-theft Smart Tag Based Portable Checkout Terminal, System and Method", published on Mar. 2, 2006, discloses a portable terminal that the user connects to his mobile device to read the barcode of the product. The mobile device connects to a store payment system and the consumer is directed to a box to validate and complete the payment. The present disclosure does not use external services and enables a consumer's own mobile to perform all stages of the purchase, including payment, and disabling the anti-theft device via the RF tag with integrated anti-theft device.

The patent document U.S. Pat. No. 8,494,908 B2 entitled: "Checkout Retail System and Method", published on Jun. 24, 2010, discloses a system for purchasing an item without an operator, where the user uses his mobile device to read an NFC tag glued to collect product information and make the payment. In contrast, the present disclosure does not require an actual terminal, and allows all stages of the purchase from the user's mobile device.

The patent document U.S. Pat. No. 8,072,332 B2 entitled: "RFID Tags with EAS Deactivation Capability", posted on Dec. 6, 2011, describes an electronic tag that combines a radio frequency device and an anti-theft device, where the radio frequency device is disabled when the anti-theft device is turned off by conventional means. The present disclosure allows safe disabling of the anti-theft device using radio frequency communication. To this end, according to an embodiment of the present disclosure, a specific electronic tag is introduced, which allows the entire operation of a purchase to be made without the need to stand in line at the checkout.

The patent document U.S. 2011/0074582 A1 entitled: "Alarming EAS Tag with RFID Features", posted on Mar. 31, 2011, discloses an electronic tag containing a battery and that can store the barcode of the product, combining functions of an RF tag and anti-theft device which are originally disabled and can be activated using a dedicated activation device. The present disclosure is different from the fact that the user's mobile device allows the deactivation of the anti-theft device securely due to countermeasures to prevent brute force and side channel attacks.

The patent document U.S. Pat. No. 8,505,829 B2 entitled: "RFID Tag Sensors and Methods", published on Aug. 13, 2013, describes methods and sensors in which a radio frequency antenna for communication over long distances can be connected and disconnected. The present disclosure describes a new type of radio frequency tag with integrated anti-theft device that enables secure payment transactions using only the user's mobile device, including disabling the anti-theft device.

SUMMARY

Additional aspects and/or advantages will be set forth in part in the description which follows and, in part, will be apparent from the description, or may be learned by practice of the invention.

The present disclosure aims to implement a given mobile payment model, where the user can make a purchase process securely using only the mobile device itself. Thus, establishments using the techniques of the present disclosure may have a few or no payment boxes to effect a sale process.

The proposed objectives are achieved by a method for secure mobile payments via a mobile device of a user, and include:
  starting a software application on a mobile device of user;
  reading the barcode of the product through the camera of the mobile device to display product information;
  making the payment of the product through secure mobile payment service of the software on the mobile device that uses a provider of ecommerce category;
  reading a product identification (tag-Id) containing a RF tag with integrated anti-theft device via radio frequency communication technologies already available on the mobile device, such as NFC technology, however, not limited to this;
  seeking a random and unique Tag-Key key corresponding to the Tag-Id in secure retail service based on network through a key management service;
  disabling the anti-theft device on the RF tag upon receiving the key (Tag-Key) from the mobile device;
  verifying that the anti-theft device was disabled properly;

in the case of the anti-theft device has not been disabled due to some problem in radio frequency tag, alerting the user that there was this problem and that he needs to release the product in a box.

Additionally, the proposed objectives are achieved through an RF tag to perform a secure mobile payment that has an integrated anti-theft device that can be disabled using the RF communication of the user's mobile device, and a secure arrangement to prevent brute force or side channels attacks. The RF tag is called "SAMS-Tag".

The validation and invalidation method of the RF tag of the present disclosure is based on radio signals emitted by the mobile device that performs a specific software application in different ways. Additionally, a method to control items validated by the software application running on the mobile device is utilized. In addition, there is a method to provide Tag-Keys keys associated with a unique random identification tag (Tag-Id) or, in another implementation the Tag-Keys keys are stored on a secure Web server.

The present disclosure applies to scenarios involving payment with mobile devices such as retail stores, supermarkets, and other scenarios involving a payment procedure. It provides a new experience between the user and the payment procedures, making them quick and decentralized.

The method of present disclosure further provides the benefit of safety involved be largely implemented outside the RF tag. This means that most of the security features are implemented at the software level, specifically in the side of the retail system. Therefore, it makes use of appropriate cryptographic protocols for transmitting confidential data between the retailer's servers and the mobile device. The critical step of disabling the "SAMS-Tag" tag is designed as a simplified mechanism of challenge-response, in which the challenge is predefined and pre-programmed in the RF tag and the answer is only transferred to the mobile device, after payment has been successfully performed.

Therefore, the method and implemented RF tag use effective mechanisms to protect against fraud that is safer than a standard NFL tag, although implemented using simple electronic circuits. This leads to a lower production cost and simplifies the implementation of an improved radio frequency tag.

In addition, equipment currently installed at retailers use anti-theft systems that are compatible with the solution and do not need be replaced.

BRIEF DESCRIPTION OF THE DRAWINGS

The objectives and advantages of the invention will become more apparent from the following detailed description of an exemplary and non-limiting embodiment from the following figures, wherein.

DETAILED DESCRIPTION

The following are described some preferred embodiments of the method of making payment for purchases without requiring boxes to record purchase of the items and RF tag with integrated anti-theft device.

Figure 1:
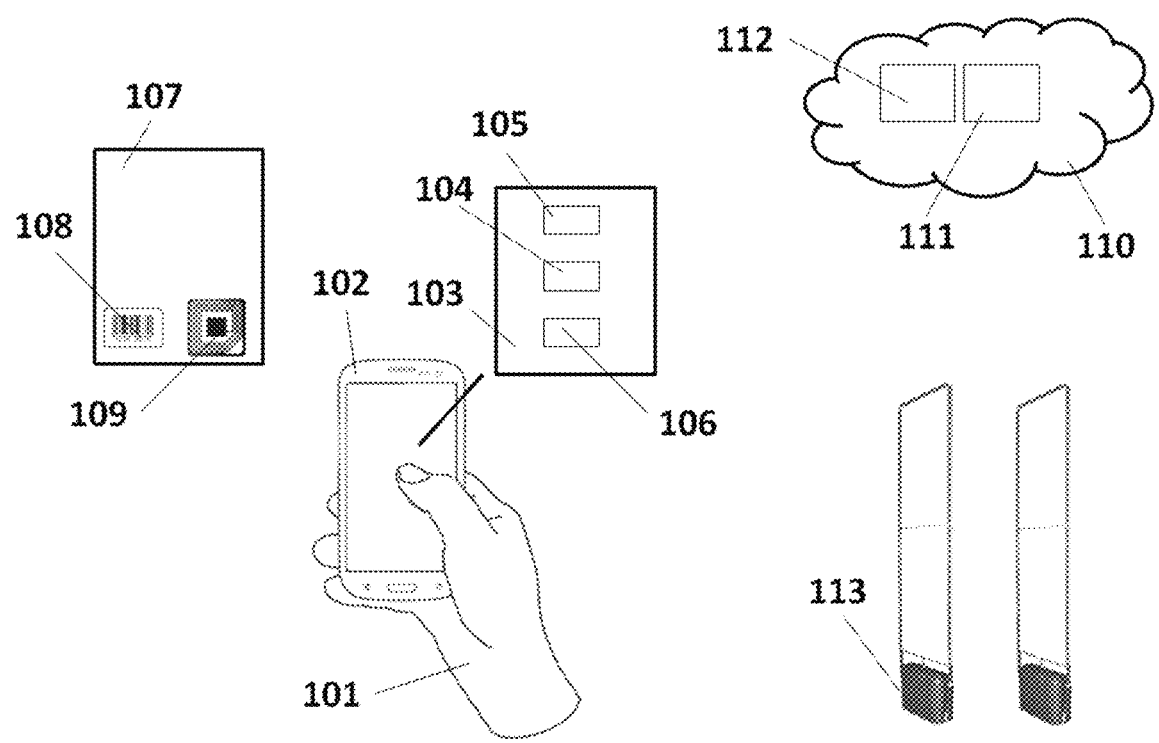
FIG. 1 shows an exemplary implementation of the system that applies the method where the user uses a RF tag and a mobile device to make payments for purchases.

FIG. 1 shows a possible implementation of an exemplary system that uses an embodiment of the present disclosure to make payment for purchases without requiring boxes to record purchases is presented. The payment is made with the use of a radio frequency tag with integrated anti-theft function and an own user's mobile device containing an application for safe shopping. According to an embodiment of the disclosure, the RF tag is called "SAMS-Tag". Also, according to an embodiment of the disclosure, the "SAMS-tag" tag must always be attached or affixed to each product. The safe retail application contains essential services related to the purchase of an item.

An embodiment of the present disclosure describes three retail services in the retail payment application 103 contained on mobile device 102 of user 101: a product information service 104, a secure payment service 105, and deactivation or reactivation service of the anti-theft device 106. The product information service 104 allows the user to choose the purchasing item that he most would like to buy, and provides the most relevant information about each item. The secure payment service 105 comprises a method to validate the payment process of the items to be checked by a control method of validated items and methods being integrated to an operations center capable of notifying the user 101, if any problem happens in effecting the payment. Finally, the deactivation or reactivation service of the anti-theft device 106 is called by the software installed on the user's mobile device by sending the unique and random "Tag-Key" key for the "SAMS-Tag" tag after confirming the payment.

A network based retail service 110 has two main services to provide secure payment: the "Tag-Keys" key management service 112 and product information service 111. The network based retail service 110 exchanges information with the retail payment application 103, for example, providing product information 107 selected by the user and verifying payments of mobile devices in purchasing process, to disable or not the anti-theft device. After payment has been made successfully by the user, the "Tag-Keys" key management service 112 sends a "Tag-Key" key to the secure payment service that in turn trigger the deactivation or reactivation service of anti-theft device, allowing the user to leave property by passing through a security gate 113 without the alarm been triggered.

Figure 2:
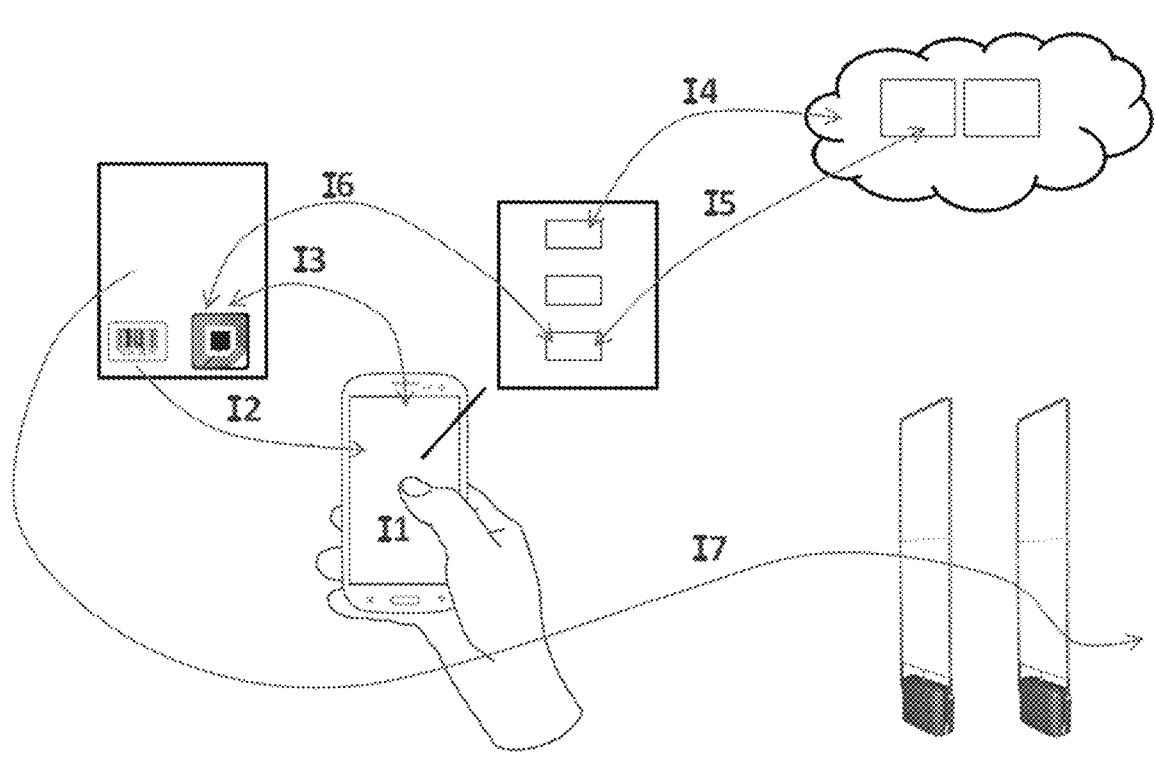
FIG. 2 shows an exemplary implementation of the system that applies the method, illustrating the relationship between the main components in a purchase process.

FIG. 2 illustrates forms of interaction between the main system components employing the method presented herein. In this figure, a user 101 who owns a mobile device 102 installs the retail payment application 103. The retail payment application 103 after triggered 11 comprises three main services available to the user to make a purchase: the product information service 104, secure payment service 105, and deactivation or reactivation service of the anti-theft device 106. The product to be acquired by this method, in this embodiment, has a barcode 108 and a "SAMS-Tag" tag 109. The barcode identifies the product within the system and its reading 12 can be performed by the camera of the mobile device, as well as the reading 13 of the identification tag-Id on the RF tag. The product "SAMS-Tag" tag containing a "Tag-Key" key sends 16 the corresponding "Tag-Key" key information for the activation and deactivation service of anti-theft function of secure purchasing application. The application passes 15 the "Tag-Key" key read 16 from the product to "Tag-Keys" management service 112 which responds 15 by signaling if the "Tag-Key" key must disable or not the anti-theft function of tag 106 fixed to that product

107. If the "SAMS-Tag" tag disables the anti-theft function, the client can leave 17 the establishment with the product, through the security gate 113 without the alarm been triggered. If the product has not been purchased, for example, the "tag-Keys" management service will not send the "Tag-Key" key to the mobile device and anti-theft device will not be disabled, thus in case client tries to leave 17 the establishment, the alarm will trigger signaling to the establishment security that there was a theft attempted or problem with payment of the product.

The secure payment service 105 is used by the user who requests a purchase 14 to the network based retail service 110. The provider 110 in turn processes the request by using the appropriate cryptographic protocols for making data transmission confidential and responds to this purchase request 14. The operation of disabling "SAMS-Tag" tag involves a simplified mechanism of challenge-response, where the challenge is predefined and pre-programmed on the tag and the correct answer is transferred to the mobile device only after the payment has been successfully accomplished. Thus, the RF tag has its computational load drastically reduced, avoiding the use of random number generators and encryption processors, for example.

Figure 3:
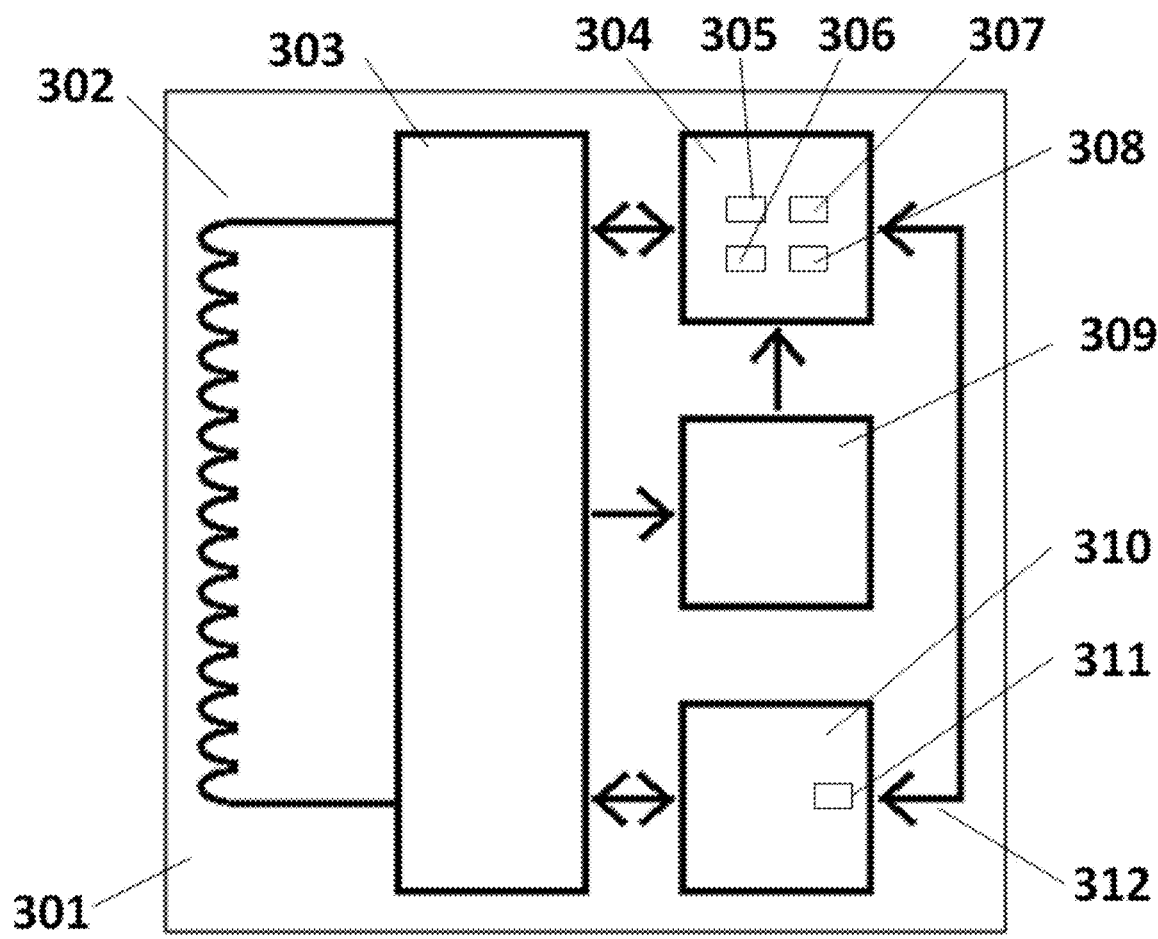
FIG. 3 shows a block diagram of a radio frequency tag according to a preferred embodiment of the present disclosure.

FIG. 3 illustrates a block diagram with the main components of the RF tag "SAMS-Tag" 301. The RF tag "SAMS-Tag" includes an integrated antenna 302 coupled to a set of radio circuits shared 303 that receives the RF signal from the antenna 302. A RF circuit 304 containing a secret storage unit or SSU 306, a public storage unit or PSU 305, an attempt counter 308, and a blocking timer 307 are disposed to be associated with the radio circuitry shared 303. SSU 306 contains information that is used to disable the anti-theft device and cannot be read or perceived externally. The PSU 305 is a unit that can be read by the RF link. The blocking timer 307 finishes the communication for a period, if several unsuccessful attempts to disable the anti-theft device occur within a short period of time, the unsuccessful attempts counter 308 prevents the RF tag to be unblocked through brute force or side channel attacks. A power supply 309 contained in the "SAMS-Tag" tag 301 extracts energy from the RF signal on communicating with the external mobile device. The anti-theft device 310 is integrated to the "SAMS-Tag" tag 301 and is in direct communication with the RF circuit 304 via an enabling or disabling logic 311 that defines if the anti-theft function is enabled or not. A connection between the RF device and anti-theft device 312 is established.

Figure 4:
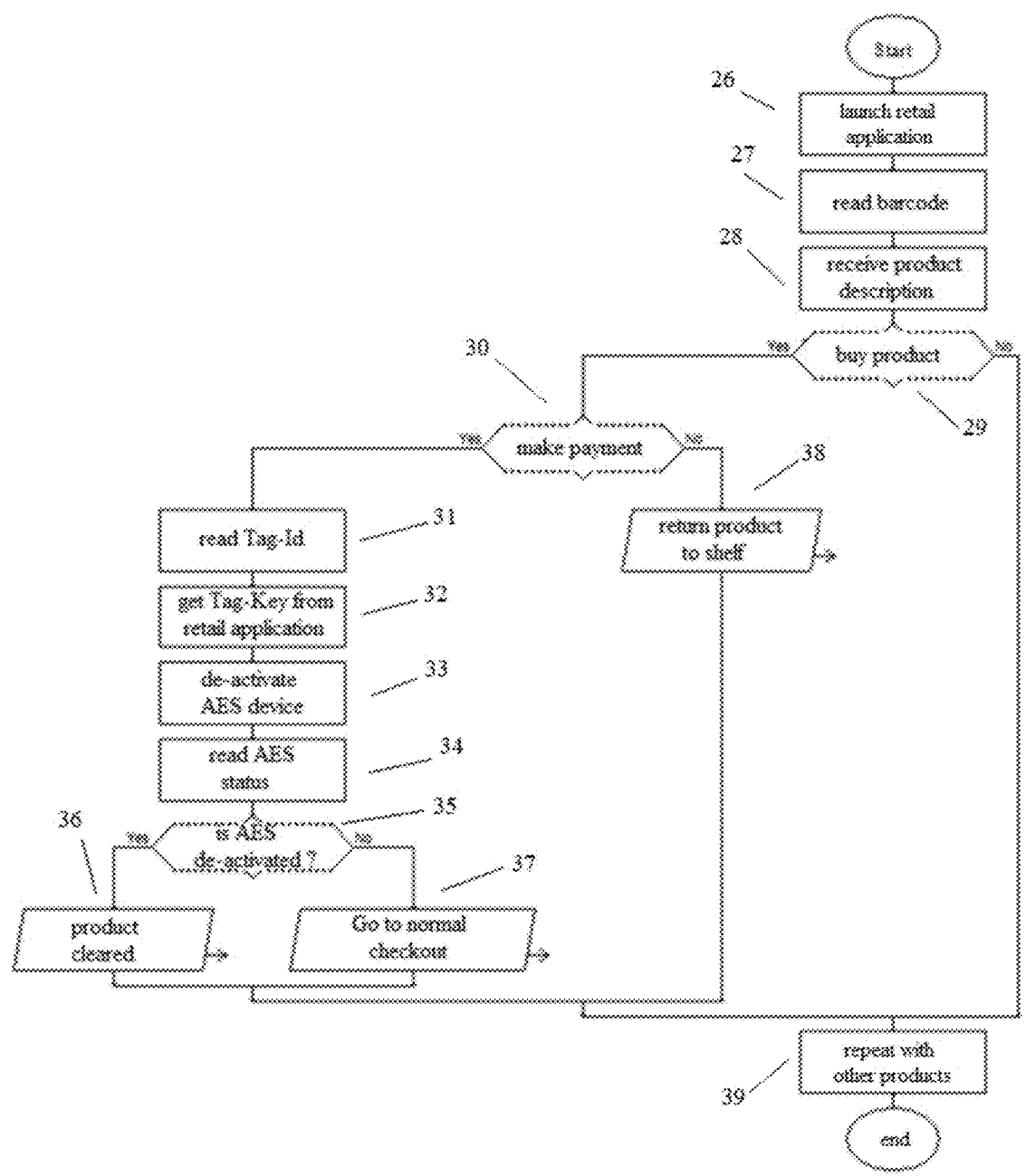
FIG. 4 shows a flowchart describing the operation of the method of payment for purchases with the use of radio frequency tag.

FIG. 4 shows a flowchart of the method for secure mobile payment and deactivation of anti-theft device using the "SAMS-Tag" tag. A client physically present in an establishment runs the secure purchase application 26 on his mobile device and accesses information about the product 28 by reading the product barcode 27 using the camera of a mobile device. Alternatively, the barcode can be added in the part of the public storage unit of the "SAMS-Tag" tag. The network based retail service sends product information to the client's mobile device. If the client decides to return the product 38, the process may be repeated, but if the client decides to buy the product 29 and pay for it through secure payment service using the network based retail service of the establishment 30, the mobile device reads 31 the "Tag-Id" identification of the "SAMS-Tag" tag and sends it to network-based purchasing system, which, in turn, retrieves the corresponding "Tag-Key" key 32 from the "SAMS-Tag" tag of the key management service based on network, which can be integrated or not with retail service and sends it back to the mobile device. The mobile device sends the "Tag-Key" key to the "SAMS-Tag" tag disabling 33 the anti-theft device. The application checks the status of the anti-theft device 34 and checks 35 if the disabling operation was successful. In the case of the anti-theft device was properly disabled, the product 36 is then released and the client can proceed through the security gate without triggering the alarm. In the case of the anti-theft device still is active after checking 35, the client is instructed to turn to a normal box to release the product 37 by disabling the anti-theft device using conventional means. If the client wishes to purchase more than one product, the steps 31-36 are repeated (operation 39). The network based retail service may have a feature that allows the addition of products in a virtual shopping cart and pay for them in one operation, and then allow the deactivation of anti-theft "SAMS-Tag" tags. If the client fails to pay, the anti-theft device will remain active.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. A method for a secure mobile payment via a mobile device of a user, the method comprising:
   reading a barcode of a product using a camera of the mobile device to display information related to the product in the mobile device;
   purchasing the product using the mobile device and a network-based retail service of an establishment;
   reading, using the mobile device, an identification (Tag-ID) of the purchased product containing a Radio Frequency (RF) tag with an anti-theft device;
   receiving, by the mobile device, a random and unique Tag-Key corresponding to the Tag-ID;
   disabling, using the mobile device, the anti-theft device in the RF tag upon receiving the Tag-Key;
   verifying the anti-theft device has been disabled by checking, using the mobile device, the status of the anti-theft device to determine whether the disabling the anti-theft device in the RF tag was successful; and
   when the anti-theft device has not been disabled, alerting the user via the mobile device,
   wherein the RF tag includes at least one of a secure blocking timer and an unsuccessful attempts counter to prevent the RF tag from being unblocked.

2. The method of claim 1, wherein the information contained in the barcode is alternatively contained in the RF tag and can therefore be recovered using radio communication.

3. The method of claim 1, wherein the network-based retail service has a resource for addition of various products in one payment.

4. The method of claim 1, wherein the unique and random Tag-Keys are obtained from a key management service allocated in the network-based retail service.

5. A Radio Frequency (RF) tag to perform a secure a mobile payment, the tag comprising:
   an anti-theft device that can be disabled using RF communication with a mobile device of a user; and
   an RF label to perform the secure mobile payment, the RF label comprising a secure blocking timer and an unsuccessful attempts counter to prevent the RF tag from being unblocked.

6. The RF label of claim 5, wherein an RF circuit and the anti-theft device are associated using activation or deactivation logic on the anti-theft device.

7. The RF label of claim 5, wherein the anti-theft device is disabled based on a random and unique Tag-Key corresponding to a Tag-ID associated with the mobile payment.

* * * * *